United States Patent [19]
Hsu

[11] Patent Number: 5,871,639
[45] Date of Patent: *Feb. 16, 1999

[54] IMPURITY FILTRATION SYSTEM FOR DRINKING WATER AND MONITORING DEVICE THEREFOR

[76] Inventor: Chao Fou Hsu, 109, Lane 316, Dah Shuenn 3th Rd., Kaohsiung, Taiwan

[ * ] Notice: The term of this patent shall not extend beyond the expiration date of Pat. No. 5,499,197.

[21] Appl. No.: 613,844

[22] Filed: Mar. 11, 1996

[51] Int. Cl.$^6$ .............................. B01D 17/12; B01D 61/12
[52] U.S. Cl. .............................. 210/87; 210/90; 210/100; 210/96.2; 210/143; 210/258; 210/416.3
[58] Field of Search ................................. 210/85, 87, 90, 210/93, 96.1, 96.2, 100, 103, 108, 138, 143, 257.2, 258, 259, 321.69, 416.3, 636, 652, 739, 741, 746, 806, 195.2; 364/479.01, 479.1, 479, 14, 496, 497, 499–502, 509, 510, 550; 340/603, 606, 609

[56] References Cited

U.S. PATENT DOCUMENTS

| | | | |
|---|---|---|---|
| 3,856,676 | 12/1974 | Grimme et al. | 210/96.2 |
| 4,801,375 | 1/1989 | Padilla | 210/100 |
| 4,918,426 | 4/1990 | Butts et al. | 210/89 |
| 4,969,991 | 11/1990 | Valadez | 210/195.2 |
| 5,096,574 | 3/1992 | Birdsong et al. | 210/90 |
| 5,296,148 | 3/1994 | Colango et al. | 210/257.2 |
| 5,450,358 | 9/1995 | Seibert et al. | 364/497 |
| 5,494,573 | 2/1996 | Schoenmeyr et al. | 210/257.2 |
| 5,499,197 | 3/1996 | Fou | 364/509 |
| 5,527,451 | 6/1996 | Hembree et al. | 210/100 |
| 5,676,824 | 10/1997 | Jeon et al. | 210/87 |

FOREIGN PATENT DOCUMENTS 464321  1/1992  European Pat. Off. .............. 210/96.2

*Primary Examiner*—Joseph W. Drodge
*Attorney, Agent, or Firm*—David & Raymond; Raymond Y. Chan

[57] ABSTRACT

A monitoring device for an impurity filtration system of drinking water comprising a microprocessor that controls the overall operations of the monitoring system, a LCD indicating circuit that relates information to maintenance personnel, a detecting component that analyses related data for determining the condition and extents of clogging of the impurity filter devices, a warning component that produces verbal or musical sound for warning consumers about the clogged condition of the water impurity filter devices, and a power switching component that cuts off electricity supply to the water pump of the purification system. In operation, the impurity filter devices will be clogged by impurities after being used for a period of time. If the impurity filter devices are clogged, the monitoring device will make a sound to warn of such condition of the impurity filter devices and will eventually cut off the power supply to the pump for stopping water delivery if the clogged impurity filter devices are not replaced after a certain period of time.

24 Claims, 6 Drawing Sheets

IMPURITY FILTRATION SYSTEM FOR DRINKING WATER AND MONITORING DEVICE THEREFOR

BACKGROUND OF THE PRESENT INVENTION

The present invention relates generally to an impurity filtration system for purifying drinking water, and more particularly to a monitoring process and device for an impurity filtration system for drinking water, which can monitor the drinking water machine to make purified and de-toxic drinking water having a quality of purity in conformity with the standard of public health. The present invention is used for notifying maintenance personnel of the timing to replace the purifying elements of the filtration system so as to ensure the purity of the drinking water.

The main culprits of the water pollution today include industrial waste, household waste, farm pesticide, and the animal waste produced by hog and poultry farms. As the pollution problems of the source of our drinking water, such as the river, become increasingly worrisome, people lose their confidence in the quality of their drinking water provided by the water company. Furthermore, people's anxiety about the quality of their drinking water is further aggravated by the fact that the conditions of the water supplying pipes and reservoirs are often found to be unsatisfactory. Accordingly, a variety of water-treating devices, such as water-filtering devices, water purifying devices, water softening devices, etc., have become ubiquitous in offices, homes, factories, schools, churches, and so forth. In the general, such conventional water-treating devices as mentioned above are provided for enhancing the purity of the drinking water. The conventional impurity filtration system for drinking water is effective in improving the quality of the drinking water. Nevertheless, the conventional impurity filtration system of drinking water is defective in design. The shortcomings inherent in the conventional drinking machines are described explicitly hereinafter.

In the conventional technology, one of the most common impurity filtration systems is the water filter device which comprises various water purifying elements, such as cotton filters. P.P. filters or CUNO type filters, for absorbing or removing various impurities and invisible particles in water.

Referring to FIG. 1, a water filter device A2 comprises a housing A21 and a filter A22, such as a cotton filter, P.P. filter or CUNO filter, installed inside the housing A21 to filter water flowing through. The filter A22 blocks off various impurities including suspended solids and organic particles. After the filter A22 is used for a period of time, the fine pores of the filter A22 are gradually clogged by such suspended solids and organic particles. Therefore, ordinary pressurized water fails to penetrate the plugged pores and only water under increased pressure can pass through the clogged filter A22. At that moment, the filter A22 not only becomes ineffective in purifying water but also provides an excellent environment for bacteria and fungi to grow. Such overused and clogged purifying elements in fact contaminate the water passing through the water impurity filtration systems instead of purifying it.

Referring to FIG. 2, sometimes, an Impurity filter device C2 of the impurity filtration system as mentioned above can be incorporated with a reverse osmosis filtration element C3 and /or a filtration element C4. The impurity filter device C2 is used to prepurify the tap water or other water from other sources before feeding it to the reverse osmosis filtration element C3. The filtration element C4 is installed before or after the reverse osmosis filtration element C3 for removing any poison content in the water. It is obvious that the impurity filtration system plays a very important role in water purifying.

However, the purifying element of the impurity filtration system should normally be replaced after a predetermined period of time of use, as required by the clogged condition of the purifying, element. In many cases, if the overused purifying element is not replaced in time, consumers will unknowingly be led to drink the poor quality water produced by such ineffective water impurity filtration system. It happens from time to time that the cleaning schedule for the purifying element of the impurity filtration system is unintentionally disregarded or overlooked. Furthermore, the chore of replacing the purifying element is not a task that people enjoy doing. It is an irresistible trend of the modern age that the consumers prefer an automated appliance rather than a manually operated appliance.

Moreover, if the impurity filtration system of drinking water is used less often, the service life of the purifying element is prolonged accordingly. Therefore, the scheduled maintenance work of the impurity filtration system is likely to be delayed or even skipped. The operating performance of the impurity filtration system is often compromised by the lack of routine maintenance work.

In fact, no matter what kind of impurity filtration system you have installed, none of the impurity filtration system's are provided with a warning system which serve to keep the user being alert for any indication that the impurity filtration system is no longer working properly to make drinking water that is absolutely safe to drink.

SUMMARY OF THE PRESENT INVENTION

The primary object of the present invention to provide a monitoring process for an impurity filtration system of drinking water for monitoring the effectiveness of the impurity filtration system, warning of its undesirable condition, and stopping the supply of drinking water from the impurity filtration system, so as to protect the unaware consumers when an undesirable condition persists.

Another object of the present invention is to provide a monitoring device of an impurity filtration system for drinking water, which is capable of automatically monitoring the quality of the drinking water made by the impurity filtration system, advancing information signals when the output water quality is under a predetermined standard, so as to warn the users of the timing of replacing the disabled filtration element in order to ensure supply of drinking water having the highest quality.

It is still another object of the present invention to provide a monitoring device for an impurity filtration system of drinking water, which is capable of ceasing supply of drinking water from the filtration system when the service life of any of the impurity filtration elements, such as cotton filters, P.P. filters or CUNO filters, is not in conformity with their safety standards, so as to ensure that the drinking water made by the impurity filtration system has the highest quality.

DETAILED DESCRIPTION OF THE PREFERRED EMBODIMENT

The present invention provides a monitoring process and device for an impurity filtration system for drinking water, which comprises a predetermined number of purifying elements.

Figure 2:
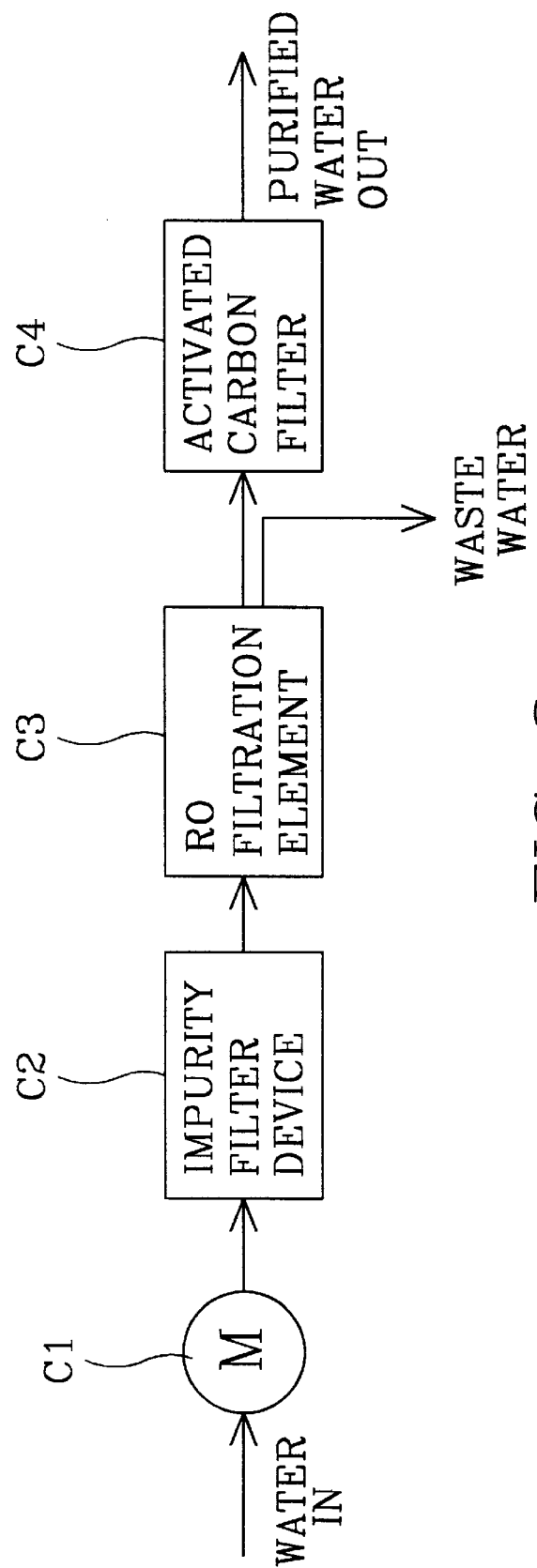
FIG. 2 is a block diagram of an impurity filtration system of drinking water which incorporates a reverse osmosis filtration element and a filtration element according to the present invention.

Ordinary water supply source, such as tap water from water companies, wells or springs, can be driven to enter an impurity filter device C2 by the natural water pressure or by pumping with a water pump C1, as shown in FIG. 2. The impurity filter device C2 contains at least one water filtration element, such as a cotton filter and P.P. filter or CUNO filter, for filtering suspended solids and removing various solid impurities and organic materials in water. The impurity filter device C2 is used to purify the incoming water. The best number and styles of the impurity filter devices C2 to be installed depend on the water quality and the amount of suspended impurities and organic particles in the water supplied from the source. Generally speaking, a combination of coarse impurity filters and a fine impurity filter can be used to remove suspended solids and organic particles of different sizes.

Figure 3:
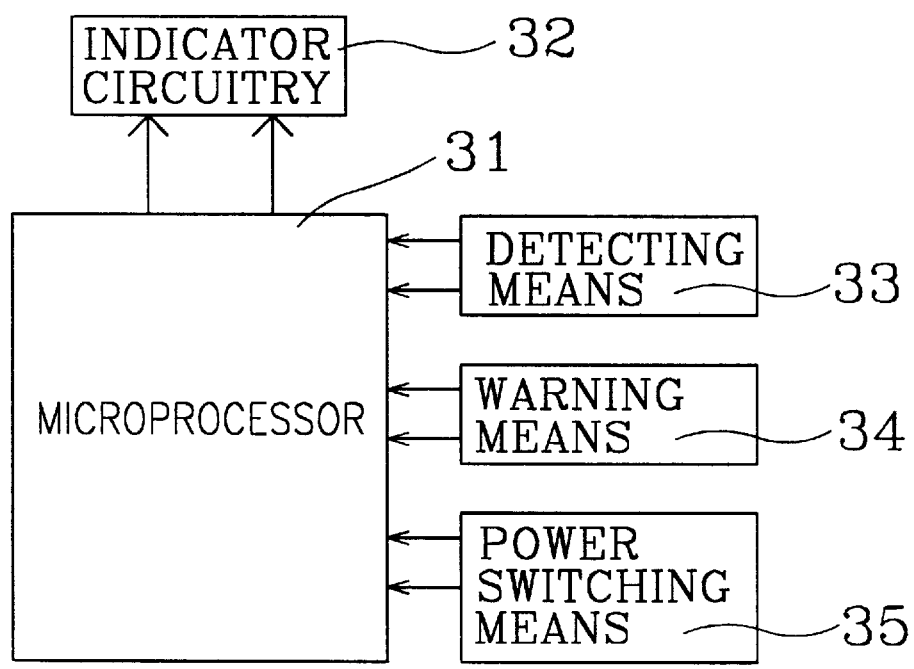
FIG. 3 is a flow chart of a monitoring device for an impurity filtration system for drinking water according to the present invention.

Referring to FIG. 3, a flow chart of the monitoring device of the present invention, the monitoring device of the present invention comprises a microprocessor 31, a LCD indictor circuitry 32 electrically connected to the microprocessor 31, a detecting means 33 electrically connected to the microprocessor 31, a warning means 34 electrically connected to the microprocessor 31, and a power switching means 35 electrically connected to the water pressure pump C1 and the microprocessor 31.

Operational signals from the detecting means 33, regarding a functional condition of each filtration element by detecting the quality of the drinking water made by the filtration elements, are sent to the microprocessor 31. When the microprocessor 31 receives such signals from the detecting means 33, the microprocessor 31 will process respective responses by respectively sending corresponding signals to the warning means 34 and the power switching means 35 for activating them to process predetermined functions.

The microprocessor 31 controls the operation of the monitoring, device and shares a power source with the impurity filtration system. A total water making volume value, that is a total volume of drinking water made by each of the filtration elements of the impurity filtration system, is formatted and input into the microprocessor 31 as a predetermined reference value which is a digital standard reference value showing the service life of the respective filtration element. A preferred embodiment of the present invention utilizes a monolithic chip microprocessor 31 such as a model number 8051 or 8052. The 1/0 memory of the microprocessor 31 is constituted by a monolithic chip. The programs stored in the microprocessor 31 control the entire operation of the monitoring device.

The LCD indicator circuitry 32 is electrically connected to the microprocessor 31 for notifying the maintenance personnel of the timing to replace the clogged filtration element of the impurity filter device C2 of the impurity filtration system and indicating a plurality of operational condition data which are sent from the microprocessor 31. The operational condition data include a current time, a recorded time of when the previous replacement of each filtration element was made, a PPM value of the drinking water made by each filtration element, a current water making volume value that shows the current volume of drinking water produced by each filtration element, the total water making volume value that is the total volume of drinking water that can be produced by each filtration element before the respective filtration element becomes ineffective, a mechanical breakdown condition that illustrates whether the impurity filtration system is normally functioning or mechanically out of order, etc. All the operational condition data are stored in the microprocessor 31.

The detecting means 33 comprises a filter detecting circuitry electrically connected to the microprocessor 31 for monitoring the functional condition of each filtration element by detecting the quantity of the drinking water made by each filtration element. The detecting means 33 comprises at least one detector for determining the functional condition of each filtration element. The detecting means 33 reads and analyzes those detected signals sent from the detector and generates a related condition detecting value. When the condition detecting value reaches the predetermined reference value, the detecting means 33 will send a digital signal to the microprocessor 31.

The warning means 34 is electrically connected to the microprocessor 31 for advancing a warning information signal to notify that it is the time for the users to replace a specific filtration element. The warning means 34 is activated by the microprocessor 31 of the monitoring device by the microprocessor 31 sending an activating signal thereto when a condition detecting value is detected approximating to the predetermined reference value, so as to indicate that the service life of the specific filtration element 4 has expired.

The power switching means 35 is electrically connected to the microprocessor 31 and activated by the microprocessor 31 for ceasing the supply of drinking water supply from the impurity filtration system when the warning means 34 is activated to generate the warning information signal for a predetermined period of time. It means that a specific filtration element of the impurity filter device C2 of the impurity filtration system has become ineffective and the drinking water so made is not safe for human consumption.

When the specific worn-out filtration element is replaced by a new one, the maintenance personnel may manually reactivate the monitoring device to produce drinking water again and to stop the warning means 34 from providing the warning information signal.

Figure 4:
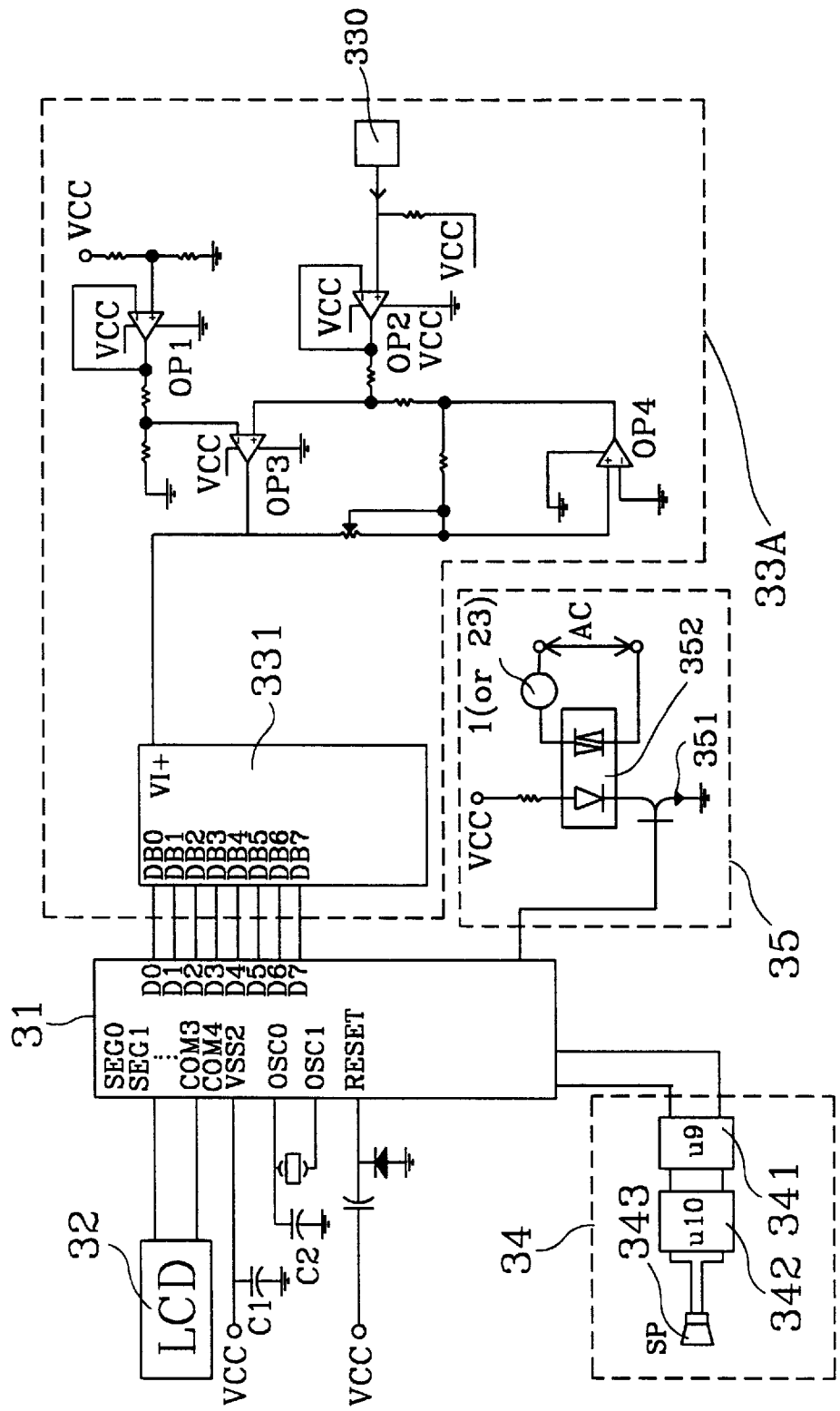
FIG. 4 is a circuit diagram of the monitoring device for an impurity filtration system having at least one impurity filter device according to the present invention.
Figure 5:
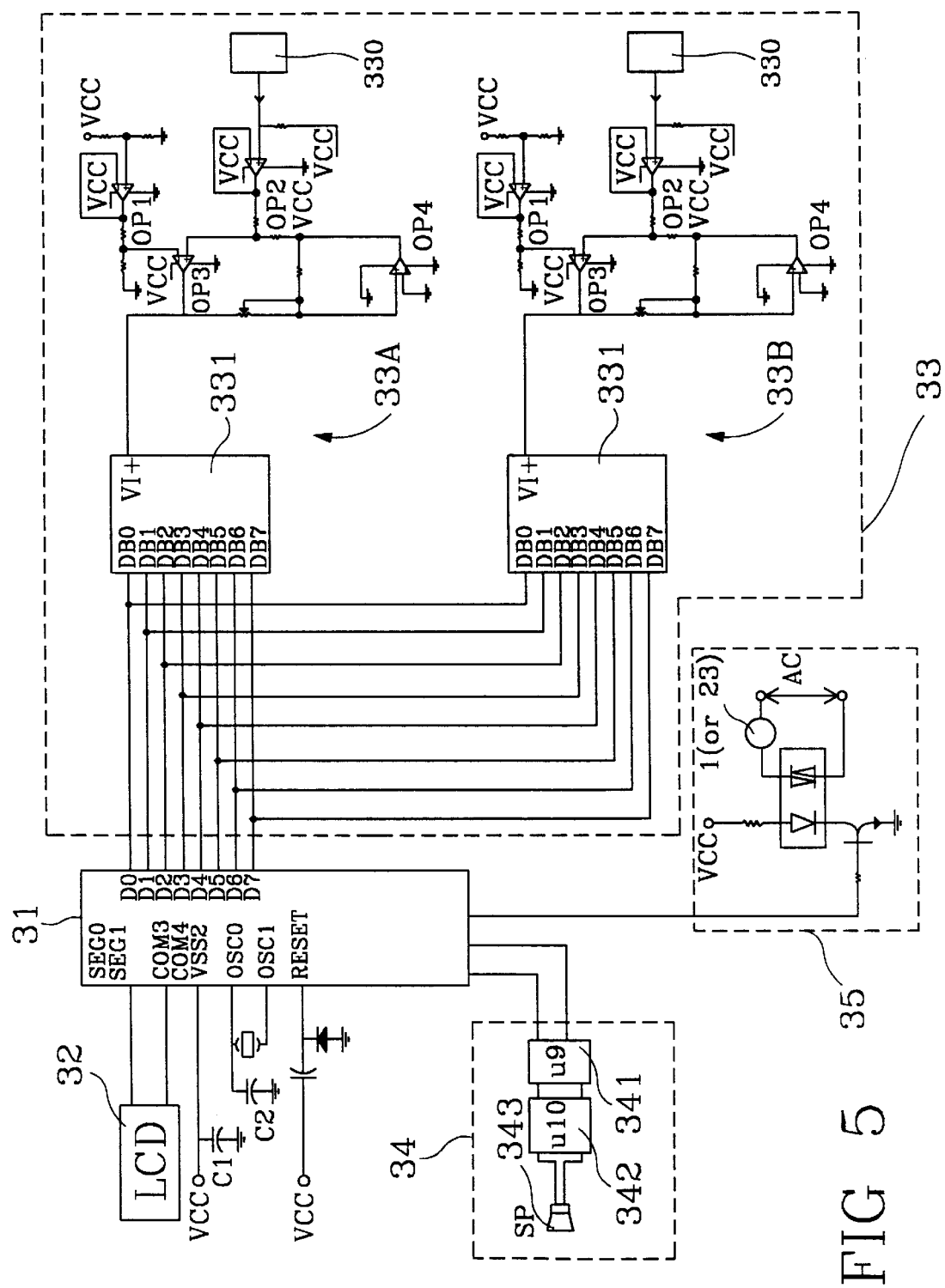
FIG. 5 is a circuit diagram of an alternative mode of the monitoring device for an impurity filtration system having at least one impurity filter device according to the present invention.
Figure 6:
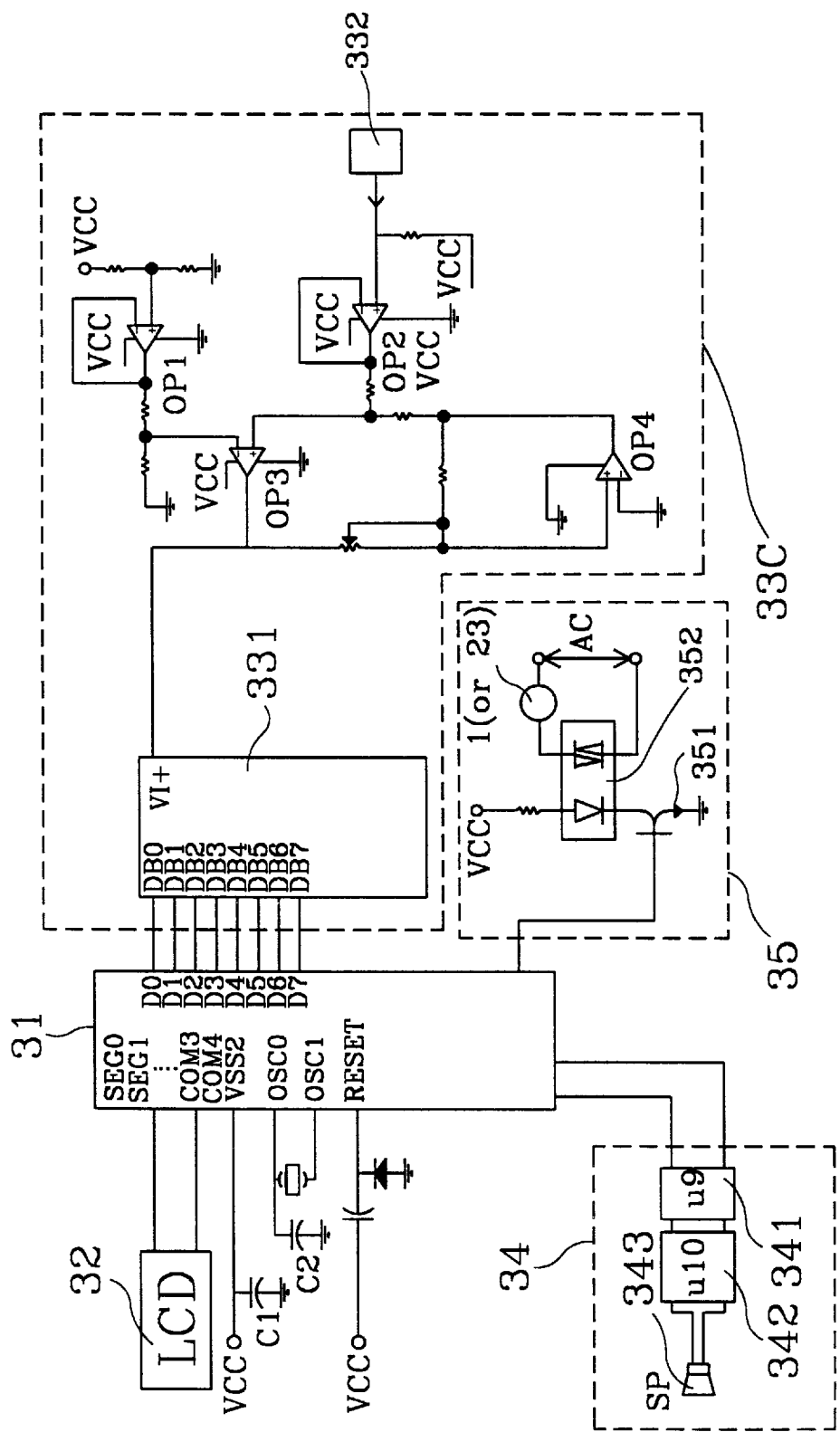
FIG. 6 is a circuit diagram of another alternative mode of the monitoring device for an impurity filtration system having at least one impurity filter device according to the present invention.

In accordance with the monitoring device of an impurity filtration system of drinking water as disclosed above, as shown in FIGS. 4 to 6, the warning means 34 comprises a sound generating circuitry having a configuration that produces verbal or musical sound for warning consumers about the clogged condition of any of the filtration elements. Of course, the sound generating circuitry 34 can be replaced with a lighting generating circuitry. Moreover, the warning means 34 can also comprises both a sound generating circuitry and a lighting generating circuitry so as to generate both warning sound and warning lighting.

The sound generating circuitry 34 comprises a sound circuit IC 341, a speaker driving circuit 342 and a speaker 343 all electrically connected, in which tile sound circuit IC 341 stores a verbal or music sound track. The speaker driving circuit 342 broadcasts the stored verbal sound or music of the sound circuit IC 341 via the speaker 343.

Due to the different natures and configurations of different impurity filter devices C2, various water quality determining methods may be applied to respectively monitor the functional conditions of the different impurity filter devices C2. Such methods are based on the fact that the water pressure in an inlet or an outlet of a filtration element of the impurity filter device C2 may increase or decrease respectively when the filtration element is clogged with impurities. The water pressure difference between the outlet and the inlet of the impurity filtration element may increase when the filtration element of the impurity filter device C2 is ineffective. When the filtration element is clogged, the outlet water flow of the filtration element will decrease. Therefore, by detecting the decrease of the water flow out of the filtration element, one can determine the clogged condition of the filtration element.

As shown in FIG. 4, the detecting, means comprises a filter detecting circuitry 33a which comprises a conventional water pressure sensor 330 installed in a water inlet of the impurity filter device C2, a plurality of operational amplifiers OP1, OP2, OP3, and OP4 and an analog to digital converter 331 all electrically connected.

In this mode of the present invention, the pressure of the inlet water of the impurity filter device C2 is detected by the water pressure sensor 330 which sends out a detected signal that is read by the operational amplifier OP2. A predetermined reference value is preset in the operational amplifier OP1 which is a water pressure datum of the water flow passing through the impurity filter device C2 when the filtration element is clogged with impurities and becomes ineffective, i.e. the service life of the filtration element has expired. A condition detecting value is generated by the operational amplifier OP2. When the filtration element is clogged, the inlet water pressure rises. Therefore, when the condition detecting value generated by the operational amplifier OP2 with regard to the inlet water pressure gradually rises to the predetermined reference value preset in the operational amplifier OP1, a clogged condition of the filtration element of the impurity filter device C2 can be detected. In case the condition detecting value detected by the operational amplifier OP2 is larger than the predetermined reference value of the operational amplifier OP1, an analog signal is sent to the analog to digital converter 331 for converting the analog signal into a digital signal which is transmitted to the microprocessor 31. The microprocessor 31 will then activate the warning means to advance a warning information signal to notify the users that it is time to replace the ineffective filtration element of the impurity filter device C2.

Accordingly, when the pressure condition detecting value generated by the operational amplifier OP2 is larger than the predetermined reference value presetting in the operational amplifier OP1, the microprocessor 31 first activates the sound generating circuitry 34 to generate verbal or musical warning sound to notify the users that the filtration element of the impurity filter device C2 is clogged and should be replaced. If such clogged condition of the impurity filter device C2 remains for a predetermined period of time, the microprocessor 31 is programmed to send an activated signal to activate the power switching means to cease the supply of drinking water supply from the whole impurity filtration system. Under such circumstances, users of the impurity filtration system are unable to obtain drinking water from the system. Therefore, supply of only quality drinking water is assured.

Referring to FIG. 5, an alternative mode of the monitoring device is illustrated. The monitoring device of this alternative mode comprises a microprocessor 31, a LCD indicator circuitry 32, a detecting means 33 which comprises two identical filter detecting circuitries 33a, 33b, a warning means 34, and a power switching means 35. This alternative mode is different from the previous mode shown in FIG. 4. The additional filter detecting circuitry 33b which also comprises a plurality of operational amplifiers OP1, OP2, OP3, and OP4, an analog to digital converter 331, and a conventional water pressure sensor 330 all electrically connected. A water pressure sensor 330 of the additional detecting circuitry 33b is installed in a water outlet of the impurity filter device C2 and connected to the operational amplifier OP2 of the additional filter detecting circuitry 33b. In this mode, a clogged condition of the filtration element of the impurity filter device C2 is determined by detecting the differential pressure between the inlet water pressure and the outlet water pressure instead of the variation in the inlet water pressure as disclosed in the above first mode (as shown in FIG. 4).

Referring to FIG. 6, another alternative mode of the present invention is illustrated. The monitoring device of this second alternative mode comprises a microprocessor 31, a LCD indicator circuitry 32, a detecting means 33 comprising a filter detecting circuitry 33c, a warning means 34, and a power switching means 35. This alternative mode is different from the first mode (as shown in FIG. 4) in that the filter detecting circuitry 33c, instead of having a pressure detecting sensor 330, comprises a water flow detecting sensor 332 installed in the water outlet of the impurity filter device C2 and connected to the operational amplifier OP2. In this mode, a clogged condition of the filtration element is detected by a reduction of the outlet water flow amount instead of by the variation in the inlet water pressure as disclosed in the first mode (as shown in FIG. 4).

Figure 1:
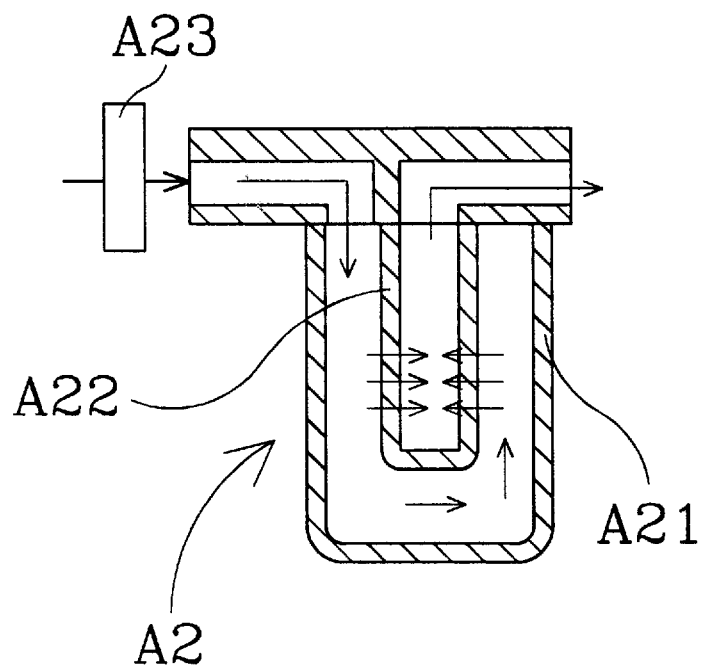
FIG. 1 is a schematic diagram illustrating the water flow directions in an impurity filter device of the present invention.

When the impurity filtration system merely contains a impurity filtration filter C2 (without incorporating a reverse osmosis filtration element C3 or the pressure pump C I), an electromagnetic gate 23 (as shown in FIG. 1) which is electrically connected with the power switching means is installed at the outlet or inlet of the impurity filter device C2, as shown in FIGS. 1, 4, 5, and 6.

As shown in FIGS. 4 to 6, the power switching means 35 of any one of the three modes comprises a transistor 351 and a photoelectric driving power transistor 352 electrically connected with the transistor 351. The programmed microprocessor 31 will send a signal to activate the transistor 351 to conduct electricity when the warning means 34 is activated to generate warning sound for a certain predetermined period of time, so that the photoelectric driving power transistor 352 activates an electromagnetic gate A23 to shut off the water flow to or from the impurity filter device C2.

The monitoring process of an impurity filtration system for drinking water according to the present invention is further described hereinafter.

The monitoring process of an impurity filtration system of drinking water having at least an impurity filter device comprises the steps of:

(1) inputting and formatting a specific service life value of the impurity filtration element into a microprocessor as a determined reference value;

(2) monitoring a functional condition of the impurity filter device by detecting the quantity of the drinking water so made by means of at least a detector and transmitting a detected signal to at least a filter detecting circuitry which is connected with the detector and the microprocessor, (3) generating a condition detecting value regarding the functional condition of the impurity filter device and comparing the condition detecting value with the predetermined reference value, regarding the service life of the impurity filter device, by the filter detecting circuitry;

(4) sending a digital signal, which is readable by the microprocessor, to the microprocessor by the filter detecting circuitry when the condition detecting value of the impurity filter device is detected approximating to the predetermined reference value, indicating that the service life of the impurity filter device is expired, (5) sending an activating signal to a warning means which is electrically connected with the microprocessor and advances a warning information signal to notify the user that it is time to replace the impurity filter device, (6) ceasing supply of drinking water to or from the impurity filtration system by shutting off an electromagnetic gate, which is installed in a water passage of the impurity filter device, by means of a power switching means which is electrically connected with the microprocessor and the electromagnetic gate, wherein the power switching means is activated by the microprocessor to shut off the electromagnetic gate to cease supply of water or from the impurity filtration system when the warnin(g means is activated to generate the warning information signal over a period of the time exceeding a certain predetermined period of time, and (7) manually stopping the warning information signal advanced by the warning means and restarting operation of the impurity filtration system to produce drinking water again when the specified worn-out filtration element is replaced by a new one.

Additionally, in the monitoring step (2), the monitoring of each impurity filter device can be operated by detecting a water pressure variation in the impurity filter device by using at least one water pressure sensor as the detector.

Additionally, in the monitoring step (2), the detector can be a water flow detecting sensor installed at the water outlet of the specific impurity filter device when the monitoring of the specific impurity filter device is operated by detecting the reduction of the outlet water flow amount of the impurity filter device.

Furthermore, after the generating step (3), the monitoring process further may comprise an indicating step of notifying the maintenance personnel of the timing for the disabling impurity filter devices of the impurity filtration system and indicating a plurality of operational condition data which is sent from the microprocessor, including the current time, the recorded time of when the previous replacement of each impurity filter device was made, the current water making volume value, the total water making volume value, and the mechanical breakdown condition, and etc., in which all the operational condition data are stored in the microprocessor.

I claim:

1. An impurity filtration system for drinking water, which comprises at least one impurity filter device having at least one filtration element therein, and includes a monitoring device which comprises:

a microprocessor operable for storing a predetermined reference value that is a water pressure value of water passing through said impurity filter device when said filtration element of said impurity filter device is clogged and has become ineffective;

a LCD indicator circuitry which is electrically connected to said microprocessor and is operable for indicating time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising a water pressure sensor and a filter detecting circuitry, wherein said water pressure sensor is installed in a water inlet of said impurity filter device and said filter detecting circuitry includes a first, a second, a third, and a fourth operational amplifier and an analog to digital converter all electrically connected, said predetermined reference value stored in said microprocessor being preset in said first operational amplifier, said water pressure sensor detecting a water pressure of water in the inlet of said impurity filter device and sending out a detected signal to said second operational amplifier which generates a condition detecting value for comparing with said predetermined reference value, wherein said water pressure water in the inlet of said impurity filter device rises when said filtration element of said impurity filter device is clogged, and in which when said condition detecting value generated by said second operational amplifier rises to larger than said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means which is electrically connected with said microprocessor and an electromagnetic gate which is installed in a water passage of said impurity filter device, said power switching means comprising a first transistor and a photoelectric driving power transistor electrically connected with said first transistor, wherein when said warning means is activated to produce said warning sound for a predetermined period of time, an activated signal is sent from said microprocessor to said power switching means to activate said first transistor to conduct electricity, so that said photoelectric driving power transistor activates said electromagnetic gate to shut off said water passage of said impurity filter device, whereby said impurity filtration system ceases to produce drinking water.

2. An impurity filtration system for drinking water, as recited in claim 1, wherein said LCD indicator circuitry is operable for indicating a plurality of operational condition data including a current time, a recorded time showing when a previous replacement of said filtration element was made a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

3. An impurity filtration system for drinking water, as recited in claim 2, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

4. An impurity filtration system for drinking water, as recited in claim 1, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

5. An impurity filtration system for drinking water, in which said impurity filtration system includes an impurity filter device comprising at least a filtration element therein, a reverse osmosis filtration element and a water pressure pump for pumping a water flowing through said reverse osmosis filtration element and said impurity filter device and including a monitoring device which comprises:

a microprocessor operable for storing a predetermined reference value that is a water pressure value of water passing through said impurity filter device when said filtration element of said impurity filter device is clogged and has become ineffective;

a LCD indicator circuitry which is electrically connected to said microprocessor and is operable for indicating the time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising a water pressure sensor and a filter detecting circuitry, wherein said water pressure sensor is installed to a water inlet of said impurity filter device and said filter detecting circuitry includes a first, a second, a third, and a fourth operational amplifier and an analog to digital converter all electrically connected, said predetermined reference value stored in said microprocessor being preset in said first operational amplifier, said water pressure sensor detecting a water pressure of water in the inlet of said impurity filter device and sending out a detected signal to said second operational amplifier which generates a condition detecting value for comparing with said predetermined reference value, wherein said water pressure of water in the inlet of said impurity filter device rises when said filtration element of said impurity filter device is clogged, and in which when said condition detecting value generated by said second operational amplifier rises to larger than said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means, which is electrically connected with said microprocessor, comprising a first transistor and a photoelectric driving power transistor electrically connected with said first transistor, wherein when said warning means is activated to produce said warning sound for a predetermined period of time, an activated signal is sent from said microprocessor to said power switching means to activate said first transistor to conduct electricity, and that said photoelectric driving power transistor is activated to cut off an electrical power of said water pressure pump to stop said water flowing through said reverse osmosis filtration element and said impurity filter device, whereby said impurity filtration system ceases to produce drinking water.

6. An impurity filtration system for drinking water, as recited in claim 5, wherein said LCD indicator circuitry is operable for indicating a plurality of operational condition data including a current time, a recorded time showing when a previous replacement of said filtration element was made, a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

7. An impurity filtration system for drinking water, as recited in claim 6, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

8. An impurity filtration system for drinking water, as recited in claim 5, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

9. An impurity filtration system for drinking water, which comprises at least one impurity filter device having at least one filtration element therein, and includes a monitoring device which comprises:

a microprocessor operable for storing a predetermined reference value that is a water pressure value of water passing through said impurity filter device when said filtration element of said impurity filter device is clogged and has become ineffective;

a LCD indicator circuitry which is electrically connected to said microprocessor and is operable for indicating the time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising two identical water pressure sensors and two filter detecting circuitries, wherein said two water pressure sensors are respectively installed in a water inlet and a water outlet of said impurity filter device and said two filter detecting circuitries each includes a first, a second, a third, and a fourth operational amplifier and an analog to digital converter all electrically connected, said predetermined reference value stored in said microprocessor being preset in said first operational amplifier of each of said filter detecting circuitries, said two water pressure sensors detecting a differential water pressure between an inlet water pressure and an outlet water pressure of said impurity filter device and sending out a detected signal to said second operational amplifier which generates a condition detecting value for comparing with said predetermined reference value, wherein said differential water pressure rises when said filtration element of said impurity filter device is clogged, and in which when said condition detecting value generated by said second operational amplifier rises to larger than said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means which is electrically connected with said microprocessor and an electromagnetic gate which is installed in a water passage of said impurity filter device, said power switching means comprising a first transistor and a photoelectric driving power transistor electrically connected with said first transistor, wherein when said warning means is activated to produce said warning sound for a predetermined period of time, an activated signal is sent from said microprocessor to said power switching means to activate said first transistor to conduct electricity, so that said photoelectric driving power transistor activates said electromagnetic gate to shut off said water passage of said impurity filter device, whereby said impurity filtration system ceases to produce drinking water.

10. An impurity filtration system for drinking water, as recited in claim 9, wherein said LCD indicator circuitry is operable for indicating a plurality of operational condition data including a current time, a recorded time showing when a previous replacement of said filtration element, was made a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

11. An impurity filtration system for drinking water, as recited in claim 10, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

12. An impurity filtration system for drinking water, as recited in claim 9, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

13. An impurity filtration system for drinking water, in which said impurity filtration system includes an impurity filter device comprising at least a filtration element therein, a reverse osmosis filtration element and a water pressure pump for pumping a water flowing through said reverse osmosis filtration element and said impurity filter device, and including a monitoring device which comprises:

a microprocessor operable for storing a predetermined reference value that is a water pressure value of water passing through said impurity filter device when said filtration element of said impurity filter device is clogged and has become ineffective;

a LCD indicator circuitry which is electrically connected to said microprocessor and is operable for indicating the time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising two identical water pressure sensors and two filter detecting circuitries, wherein said two water pressure sensors are respectively installed in a water inlet and a water outlet of said impurity filter device and said two filter detecting circuitries each includes a first, a second, a third, and a fourth operational amplifier and an analog to digital converter all electrically connected, said predetermined reference value stored in said microprocessor being preset in said first operational amplifier of each of said filter detecting circuitries, said two water pressure sensors detecting a differential water pressure between an inlet water pressure and an outlet water pressure of said impurity filter device and sending out a detected signal to said second operational amplifier which generates a condition detecting value for comparing with said predetermined reference value, wherein said differential water pressure rises when said filtration element of said impurity filter device is clogged, and in which when said condition detecting value generated by said second operational amplifier rises to larger than said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means, which is electrically connected with said microprocessor, comprising a first transistor and a photoelectric driving power transistor electrically connected with said first transistor, wherein when said warning means is activated to produce said warning sound for a predetermined period of time, an activated signal is sent from said microprocessor to said power switching means to activate said first transistor to conduct electricity, and that said photoelectric driving power transistor is activated to cut off an electrical power of said water pressure pump to stop said water flowing through said reverse osmosis filtration element and said impurity filter device, whereby said impurity filtration system ceases to produce drinking water.

14. An impurity filtration system for drinking water, as recited in claim 13, wherein said LCD indicator circuitry is operable for indicating a plurality of operational condition data including a current time, a recorded time showing when a previous replacement of said filtration element was made, a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

15. An impurity filtration system for drinking water, as recited in claim 14, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

16. An impurity filtration system for drinking water, as recited in claim 13, wherein said sound generating circuitry comprises a sound circuit, a speaker driving circuit and all speaker all electrically connected, said sound circuit storing a sound track and said speaker driving circuit broadcasting said stored sound track of said sound circuit via said speaker.

17. An impurity filtration system for drinking water, which comprises at least one impurity filter device having at least one filtration element therein, and includes a monitoring device which comprises:

a microprocessor operable for storing a predetermined reference value that is a water flow value of water passing through said impurity filter device when said filtration element of said impurity filter device is clogged and has become ineffective;

a LCD indicator circuitry which is electrically connected to said microprocessor and is operable for indicating the time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising a water flow detecting sensor and a filter detecting circuitry, wherein said water flow detecting sensor is installed to a water outlet of said impurity filter device and said filter detecting circuitry includes a first, a second, a third, and a fourth operational amplifier and an analog to digital converter all electrically connected, said predetermined reference value stored in said microprocessor being preset in said first operational amplifier, said water flow detecting sensor detecting a reduction of said water flow in said water outlet of said impurity filter device when said filtration element is clogged, and then said water flow detecting sensor sending out a detected signal to said second operational amplifier which generates a condition detecting value for comparing with said predetermined reference value, wherein when said condition detecting value generated by said second operational amplifier matches with said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means which is electrically connected with said microprocessor and an electromagnetic gate which is installed in a water passage of said impurity filter device, said power switching means comprising a first transistor and a photoelectric driving power, transistor electrically connected with said first transistor, wherein when said warning means is activated to produce said warning sound for a predetermined period of time, an activated signal is sent from said microprocessor to said power switching means to activate said first transistor to conduct electricity, so that said photoelectric driving power transistor activates said electromagnetic gate to shut off said water passage of said impurity filter device, whereby said impurity filtration system ceases to produce drinking water.

18. An impurity filtration system for drinking water, as recited in claim 17, wherein said LCD indicator circuitry is operable for indicating a plurality of operational condition data including a current time, a recorded time showing when a previous replacement of said filtration element was made, a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

19. An impurity filtration system for drinking water, as recited in claim 18, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

20. An impurity filtration system for drinking water, as recited in claim 17, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

21. An impurity filtration system for drinking water, in which said impurity filtration system includes an impurity filter device comprising at least a filtration element therein, a reverse osmosis filtration element and a water pressure pump for pumping a water flowing through said reverse osmosis filtration element and said impurity filter device, and including a monitoring device which comprises:

a microprocessor operable for storing a predetermined reference value that is a water pressure value of water passing through said impurity filter device when said filtration element of said impurity filter device is clogged and has become ineffective;

a LCD indicator circuitry which is electrically connected to said microprocessor and is operable for indicating the time to replace said filtration element of said impurity filter device;

a warning means which is electrically connected to said microprocessor for advancing a warning information signal to notify a user of said time to replace said filtration element of said impurity filter device, wherein said warning means comprises a sound generating circuitry for producing a warning sound as said warning information signal;

a detecting means comprising a water flow detecting sensor and a filter detecting circuitry, wherein said water flow detecting sensor is installed in a water outlet of said impurity filter device and said filter detecting circuitry includes a first, a second, a third, and a fourth operational amplifier and an analog to digital converter all electrically connected, said predetermined reference value stored in said microprocessor being preset in said first operational amplifier, said water flow detecting sensor detecting a reduction of said water flow in said water outlet of said impurity filter device when said filtration element is clogged, and then said water flow detecting sensor sending out a detected signal to said second operational amplifier which generates a condition detecting value for comparing with said predetermined reference value, wherein when said condition detecting value generated by said second operational amplifier matches with said predetermined reference value of said first operational amplifier, an analog signal is sent to said analog to digital converter for converting said analog signal into a digital signal, said digital signal being transmitted to said microprocessor, wherein said microprocessor activates said sound generating circuitry of said warning means to produce said warning sound to notify said user that said filtration element of said impurity filter device is clogged and must be replaced; and a power switching means, which is electrically connected with said microprocessor, comprising a first transistor and a photoelectric driving power transistor electrically connected with said first transistor, wherein when said warning means is activated to produce said warning sound for a predetermined period of time, an activated signal is sent from said microprocessor to said power switching means to activate said first transistor to conduct electricity, and that said photoelectric driving power transistor is activated to cut off an electrical power of said water pressure pump to stop said water flowing through said reverse osmosis filtration element and said impurity filter device, whereby said impurity filtration system ceases to produce drinking water.

22. An impurity filtration system for drinking water, as recited in claim 21, wherein said LCD indicator circuitry is operable for indicating a plurality of operational condition data including a current time, a recorded time showing when a previous replacement of said filtration element was made, a PPM value of a drinking water made by said filtration element, a current water making volume value that shows a current volume of said drinking water produced by said filtration element, a total water making volume value that is a total volume of said drinking water that said filtration element is able to produce before said filtration element has become clogged, and a mechanical breakdown condition that illustrates whether said impurity filtration system is mechanically out of order.

23. An impurity filtration system for drinking water, as recited in claim 22, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

24. An impurity filtration system for drinking water, as recited in claim 21, wherein said sound generating circuitry comprises a sound circuit, a speaker driving circuit and a speaker all electrically connected, said sound circuit storing a sound track and said speaker driving circuit broadcasting said stored sound track of said sound circuit via said speaker.

* * * * *